June 11, 1929.  J. B. MACAULEY, JR  1,716,496
VIBRATION DAMPENER
Filed Jan. 24, 1927
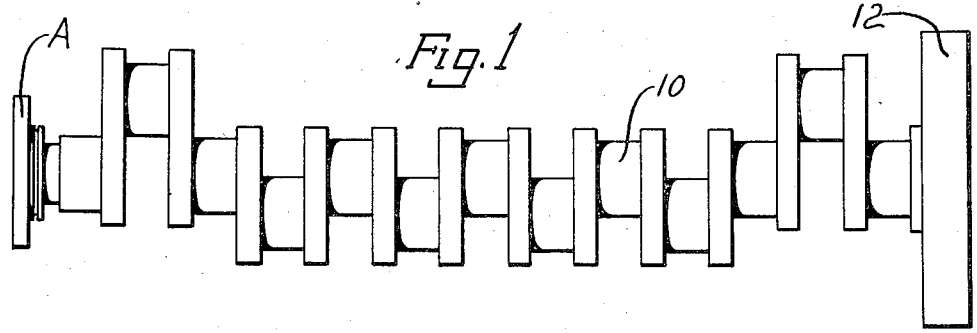
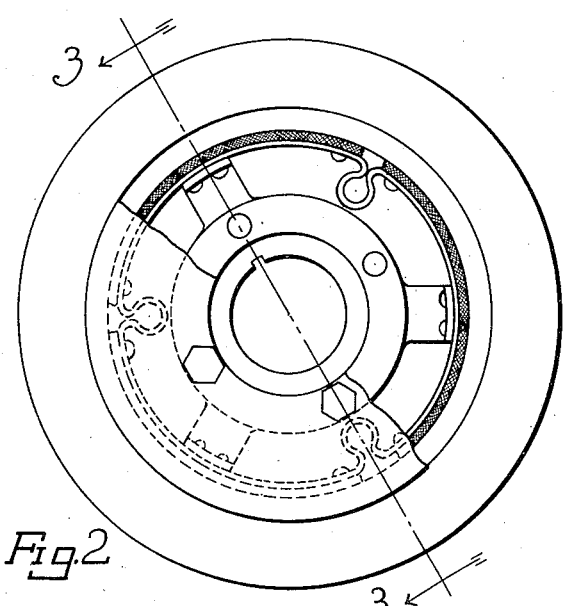
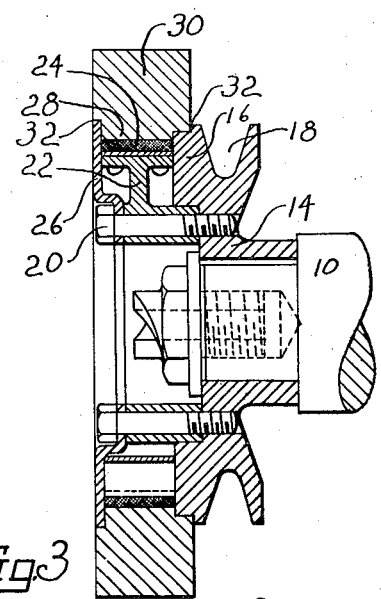
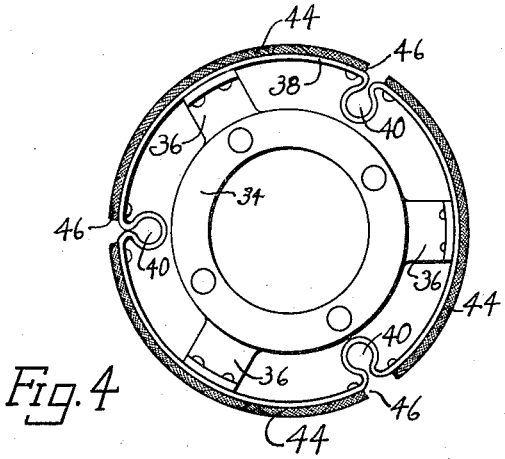
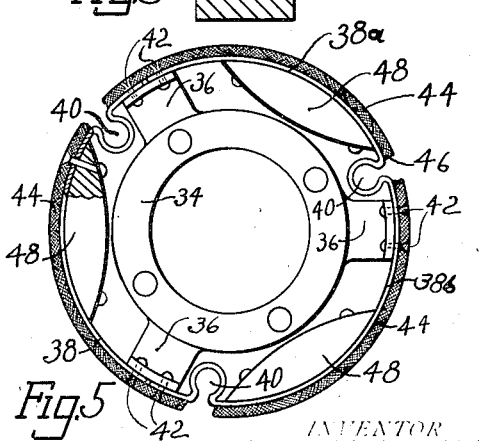
INVENTOR
JOHN B. MACAULEY, JR Patented June 11, 1929.

1,716,496

UNITED STATES PATENT OFFICE.

JOHN B. MACAULEY, JR., OF DETROIT, MICHIGAN, ASSIGNOR TO CHRYSLER CORPORATION, OF DETROIT, MICHIGAN, A CORPORATION OF DELAWARE.

VIBRATION DAMPENER.

Application filed January 24, 1927. Serial No. 163,119.

This invention relates to internal combustion engines and more particularly to torsional vibration dampening means therefor. Specifically the invention relates to the construction of a device known as a torsional vibration dampener for eliminating certain torsional vibration in the running of multicylinder engines used in motor vehicles.

In such motors the explosions in the cylinders, at certain speeds, synchronize with the natural periodic vibration of the crankshaft. This vibration is transferred to the frame or base of the motor through the reciprocating parts of the latter and becomes objectionable particularly when it occurs at high speed.

Heretofore, the practice has been to provide a slipping ring on the crankshaft designed to eliminate vibration at a particular speed but not entirely satisfactory for all periods of vibration.

An important object of the invention is to provide a dampener in which a slipping inertia ring is frictionally rotated by the crankshaft and the amount of friction grip is varied in proportion to the speed of the crankshaft.

Another object of the invention is to provide frictional engaging surfaces which are centrifugally urged into frictional engagement with an inertia member to cause the latter to rotate therewith.

A further object of the invention is to provide an inexpensive construction in which a resilient ring member, preferably a stamping and having a friction member secured thereto, is adapted to be centrifugally expanded for engagement with an adjacent inertia ring.

These and other objects of the invention will more fully appear from the following description taken in connection with the accompanying drawings in which:

Fig. 1 is a side elevation of a crankshaft and flywheel embodying the invention.

Fig. 2 is an end view of the dampener, parts being broken away.

Fig. 3 is a sectional view taken on line 3—3 of Fig. 2.

Fig. 4 is a view of the resilient ring member.

Fig. 5 is a view showing a modification of the ring.

Referring to the illustrated embodiment of my invention, a crankshaft 10 has been shown provided with a flywheel 12 at one end thereof and a dampener A at the other end thereof.

The dampener A comprises a hub member 14 which is keyed to the crankshaft 10 and provided with a radial integral flange 16 which has been shown grooved as at 18 forming the fan belt pulley. Laterally secured to the hub 14, such as by bolts 20, is a friction ring 22 having its outer periphery provided with a lining 24 and a retaining member 26 are assembled with the ring 22 to the hub 14, to rotate therewith, shown as secured by the bolts 20. The retaining member 26 extends radially beyond the outer periphery of the friction ring 22 which together with the flange 16, also extending radially beyond the outer periphery of the friction ring 22, forms an annular groove 28. An inertia ring 30 is rotatably mounted in the groove 28 with its inner periphery adjacent to or in frictional engagement with the friction ring 22, it being supported as at 32 by the radially extending flange of the retaining member and the flange 16.

The friction ring 22, as illustrated, consists of an inner ring 34 having radially extending flanges 36 to which are secured a resilient ring 38. The ring 38 has been shown in Fig. 4 as continuous, riveted to the flanges 36. Between the connections are loops 40 which permit expansion of the ring. The ring may be formed of segments $38^a$ and $38^b$, as shown in Fig. 5, each segment provided with a loop or loops 40, the segments being secured together as at 42. A lining 44 secured to the ring 38 is broken as at 46, adjacent the loops 40 to permit expansion. It will be understood that when the ring is rotated the centrifugal force will throw the portions of the ring adjacent the loops radially into engagement with the inner periphery of the inertia ring 30 with progressively increased pressure as the speed of rotation is increased.

At extremely low speeds slight pressure is created and the inertia ring 30 is permitted to slip more easily, dampening out the period of vibration for that speed and when a higher speed of rotation is reached another period of vibration is dampened out due to the increased pressure between the rotating member and ring 30, the ring being more tightly held from slipping.

Referring to Fig. 5, a modification of the construction has been shown in which weights 48 have been added for the purpose of increasing the centrifugal force if more pressure is necessary. The weights 48 have been secured to the inner side of the ring 38 and the loops 40 are located adjacent the point 42 where the ring is secured to the flanges 36.

The ring 38 is made of suitable spring material formed in such a manner that it is connected through its entire periphery yet free for expansion. It is to be understood that various modifications of my invention may be made without departing from the spirit thereof and it is not my intention to limit its scope other than by the terms of the appended claims.

What I claim is:

1. In a vibration dampener of the class described comprising, a rotatable member, an annular ring having a plurality of inwardly bent loops to permit radial expansion thereof, said ring secured to said rotatable member at points between said loops to rotate therewith an inertia ring, means for supporting said inertia ring relatively rotatable with said rotatable member, and a friction member between said ring and said inertia member to form a driving connection therebetween.

2. In a vibration dampener of the class described comprising, a rotatable member, an inertia member supported on said rotatable member for relative rotation therewith, a friction member for engagement with said inertia member and rotatable with said rotatable member, and an annular ring having a plurality of inwardly bent loops to permit radial expansion thereof to vary the amount of frictional engagement between said friction ring and said inertia member.

3. In a vibration dampened of the class described comprising, a rotatable member, an inertia ring mounted for relative rotation with said rotatable member, a friction ring rotatable with said rotatable member for engagement with the inner periphery of said inertia member, and an annular ring having a plurality of inwardly bent loops to permit radial expansion by centrifugal force to vary the amount of frictional engagement between said inertia ring and said friction ring dependent on the speed of rotation.

4. In a vibration dampener of the class described comprising, a rotatable member, having a friction surface rotatable therewith, an inertia member relatively rotatable with said rotatable member adapted for frictional engagement with said friction surface, and a continuous ring adapted for radial expansion to vary the amount of frictional engagement between said parts.

5. In a vibration dampener of the class described comprising, a rotatable member, having a friction surface rotatable therewith, an inertia member relatively rotatable with said rotatable member adapted for frictional engagement with said friction surface, and a continuous expansible ring weighted at intervals to cause radial expansion thereof when rotated to vary the amount of frictional engagement of said members dependent on the speed of rotation.

6. In a vibration dampener of the class described comprising, a rotatable member, an inertia member mounted for relative rotation with said rotatable member, a friction member for engagement with said inertia member and rotatable with said rotatable member, and a continuous ring adapted for radial expansion to vary the amount of frictional engagement between said members.

JOHN B. MACAULEY, Jr.